United States Patent
Poolathody et al.

(10) Patent No.: US 11,841,718 B1
(45) Date of Patent: Dec. 12, 2023

(54) PNEUMATIC INLET/BLOWDOWN VALVE ASSEMBLY

(71) Applicant: Ingersoll-Rand Industrial U.S., Inc., Davidson, NC (US)

(72) Inventors: Sajesh Poolathody, Kerala (IN); Dhananjaya Ambula Lingappa, Karnataka (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 17/860,499

(22) Filed: Jul. 8, 2022

(51) Int. Cl.
    *G05D 16/20* (2006.01)
    *F15B 15/14* (2006.01)

(52) U.S. Cl.
    CPC ......... *G05D 16/2022* (2019.01); *F15B 15/14* (2013.01); *G05D 16/2033* (2013.01)

(58) Field of Classification Search
    CPC .. G05D 16/2022; G05D 16/2033; F15B 15/14
    See application file for complete search history.

(56) References Cited

U.S. PATENT DOCUMENTS

| | | |
|---|---|---|
| 3,367,562 A | 2/1968 | Edvard et al. |
| 4,068,980 A | 1/1978 | Fine et al. |
| 4,335,582 A | 6/1982 | Shaw et al. |
| 4,549,856 A | 10/1985 | Cash et al. |
| 4,815,950 A | 3/1989 | Aoki et al. |
| 4,934,652 A * | 6/1990 | Golden ............... F16K 31/1221 251/327 |
| 5,924,672 A * | 7/1999 | Crochet .............. F16K 31/1221 105/377.07 |
| 6,026,587 A | 2/2000 | Cunkelman et al. |
| 10,072,682 B2 * | 9/2018 | McEvoy .............. F16K 31/1221 |
| 2006/0193728 A1 | 8/2006 | Lindsey et al. |
| 2010/0054958 A1 | 3/2010 | Hartl et al. |

FOREIGN PATENT DOCUMENTS

WO       2004018878 A1       3/2004

OTHER PUBLICATIONS

Extended European Search Report for EP23182531.6, dated Sep. 28, 2023.

* cited by examiner

Primary Examiner — Eric Keasel
(74) Attorney, Agent, or Firm — Kevin E. West; Advent, LLP

(57) ABSTRACT

A fluid compressor system having a pneumatic inlet/blowdown valve assembly that utilizes pneumatic pressure and vacuum available in the fluid compressor system for the actuation of an inlet valve and a blowdown valve. The actuation of the inlet valve and the blowdown valve is synchronized via a piston-cylinder actuator having a first piston and a second piston axially connected. The pneumatic blowdown/inlet valve assembly uses a first stage vacuum pressure to actuate the first piston and the second piston from an idle state where the inlet valve is closed to stop a flow of working fluid into the fluid compressor system and the blowdown valve is open to depressurize the fluid compressor system to an actuated state where the inlet valve is open to allow the flow of working fluid into a first airend and the blowdown valve is closed to allow a pressure buildup in the fluid compressor system.

20 Claims, 6 Drawing Sheets

PNEUMATIC INLET/BLOWDOWN VALVE ASSEMBLY

BACKGROUND

Compressors increase the pressure of a compressible fluid (e.g., air, gas, etc.) by reducing the volume of the fluid. Often, compressors are staged so that the fluid is compressed several times in different stages, to further increase the discharge pressure of the fluid. As the pressure of the fluid increases, the temperature of the fluid also increases. In some compressors, the compressed fluid may be cooled in between stages. Compressors are divided into positive displacement compressors and dynamic compressors.

DRAWINGS

The Detailed Description is described with reference to the accompanying figures. The use of the same reference numbers in different instances in the description and the figures may indicate similar or identical items.

DETAILED DESCRIPTION

Figure 1:
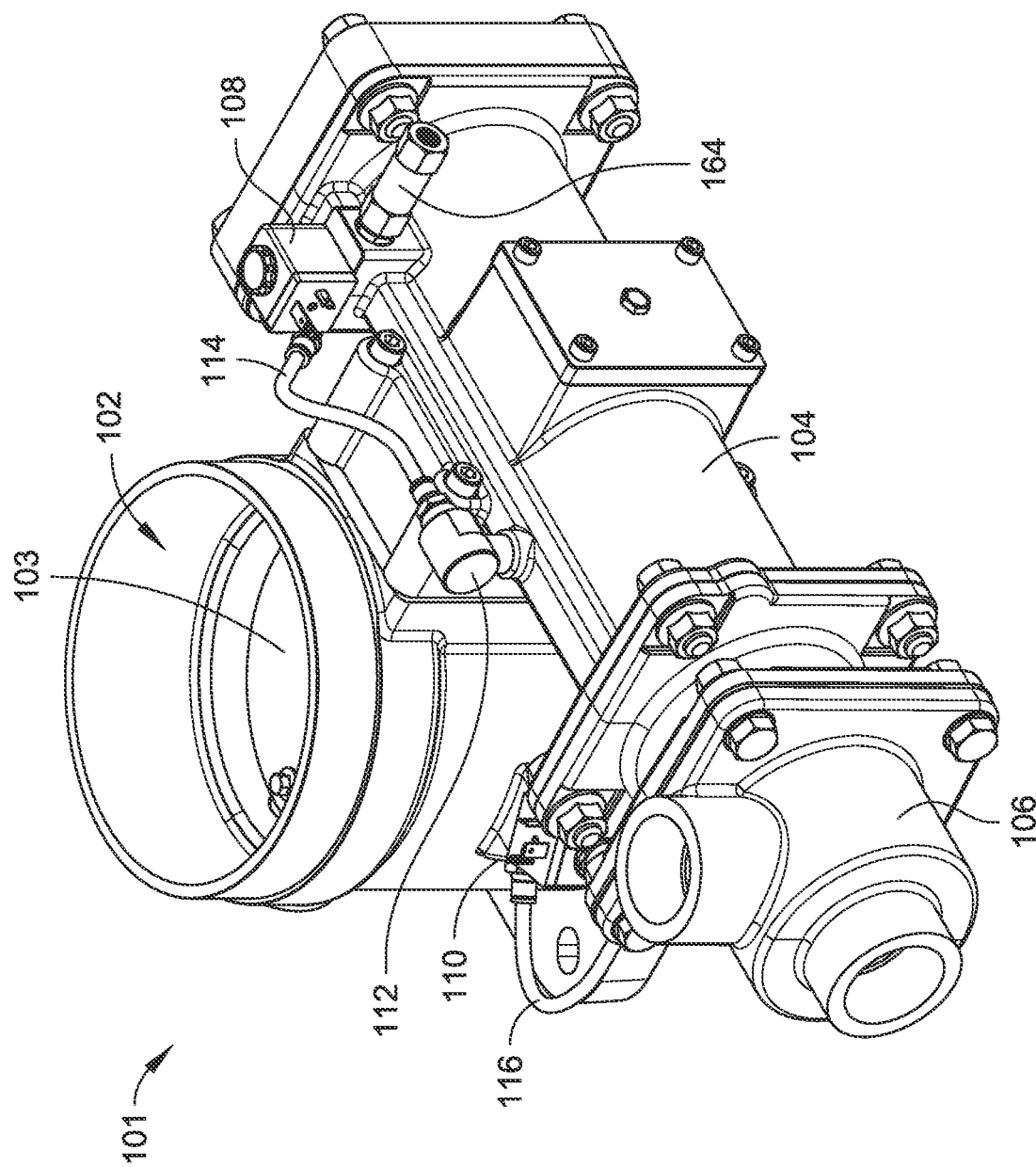
FIG. 1 is an isometric front view of a pneumatic inlet/blowdown valve assembly in accordance with example embodiments of the present disclosure.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Fluid compressors systems increase the pressure of a working fluid such as air or gas, and are widely used in a variety of industries such as in construction, manufacturing, agriculture, energy production, etc. Positive displacement compressor systems such as, but not limited to, rotary screw compressors, confine a successive volume of the working fluid within a closed space that is mechanically reduced, compressing the working fluid and increasing the working fluid's pressure and temperature. Types of rotary screw compressors include contact-cooled rotary (CCR) compressors, also called oil-injected rotary screw compressors, and oil-free rotary (OFR) compressors.

In fluid compressor systems, capacity control is employed to regulate the capacity of the compressed working fluid, where the capacity of the fluid compressor system is the quantity of working fluid at which the fluid compressor system will operate at a specific discharge pressure. In rotary screw compressors, different capacity control schemes are used, including start/stop, load/unload, modulation, variable displacement, and variable speed. Load/unload (having a load operation and an unload operation) and modulation capacity control schemes are controlled through an inlet valve operating in synchrony with a blowdown valve.

The use of pneumatic valves has benefits when compared to other types of valves such as hydraulic valves and diaphragm valves. For example, pneumatic valves may be less prone to leaking, are compact in size, and are easier to service as pneumatic lines can be vented directly to the atmosphere, whereas oil lines in hydraulic valves must be drained to a sump prior to any service operation.

CCR compressors include a separation tank which stores compressed air that can be used as a source for actuation of pneumatic valves, including the inlet valve. A minimum pressure check valve (MPCV) maintains a minimum system pressure inside the separator tank. Using this minimum system pressure aids the pneumatic actuation of the inlet valve during a cold start or even when the system changes from an unload state to a load state. Thus, most inlet valves in CCR compressors are pneumatically operated.

OFR compressor systems do not typically have a separation tank with minimum pressure check valve. Hence typically an OFR compressor systems do not have a minimum system pressure when starting from a cold start to actuate a pneumatic inlet valve. In OFR compressor systems, a second stage outlet is connected to the blowdown valve or unloader valve for the unloading operation or to start the OFR compressor systems with a minimum back pressure. The inlet valve and blowdown valve operations are synchronized in such a way that inlet valve will be in a closed condition (Normally Closed) and the blowdown valve will be in an open condition (Normally Open). OFR compressor systems may not develop a pressure buildup unless the blowdown valve is closed. Since both the inlet valve and blowdown valve operations are synchronized, finding a source of energy for closing the blowdown valve is necessary to provide a completely pneumatic inlet valve for an OFR compressor system.

Accordingly, the present disclosure is directed to a fluid compressor system having a pneumatic inlet/blowdown valve assembly that utilizes a combination of pneumatic pressure and vacuum available in the fluid compressor system for the actuation of the inlet valve and the blowdown valve. The inlet valve is integrated with the blowdown valve, where their respective actuation is synchronized with the other.

DETAILED DESCRIPTION OF EXAMPLE EMBODIMENTS

Referring generally to FIGS. 1 through 6, a fluid compressor system 100 is shown. The fluid compressor system 100 includes a first air-end 136, a second air-end 138, and a pneumatic inlet/blowdown valve assembly 101. The fluid compressor system 100 may include a motor 140 driving the first air-end 136 and the second air-end 138. The first air-end 136 receives a compressible working fluid (e.g., air, gas, etc.) and compresses the working fluid in a first stage compression process. This compression also increases the temperature of the working fluid.

In example embodiments, the fluid compressor system 100 includes a fluid filter 134 disposed upstream from the pneumatic inlet/blowdown valve assembly 101 and the first air-end 136. The fluid filter 134 may filter particles from the working fluid and prevents particulate matter from entering the fluid compressor system 100.

In example embodiments, the fluid compressor system 100 includes an intercooler 142 to cool down the working fluid delivered by the first air-end 136 and an interstage moisture separator 144 to separate moisture from the working fluid prior to entering the second air-end 138. An interstage blowdown solenoid valve 146 may be coupled between the interstage moisture separator 144 and the second air-end 138 to vent an interstage pressure. In example embodiments (not shown), the fluid compressor system 100 may include an interstage venturi, also called a first stage venturi, coupled downstream from the first air-end 136 and upstream from the second air-end 138 to reduce pulsations within the compressed working fluid delivered by the first air-end 136.

The second air-end 138 receives the working fluid delivered by the interstage moisture separator 144 and further compresses it. In example embodiments, the fluid compressor system 100 also includes a discharge venturi 150, also called a second stage venturi, to reduce pulsations in the compressed fluid discharged from second stage compression process occurring in the second air-end 138. After passing through the discharge venturi 150, the working fluid may flow through a discharge check valve 152, an after cooler 154, and a second stage moisture separator 156, prior to exiting the fluid compressor system 100 for delivery.

In the example embodiment shown in FIGS. 1 through 5, the pneumatic inlet/blowdown assembly 101 includes an inlet valve 102, a blowdown valve 106, a piston-cylinder actuator 104, a first solenoid valve 110, and a second solenoid valve 112. The inlet valve 102 receives the working fluid entering the fluid compressor system 100 and regulates flow of the working fluid before it enters the first air-end 136. In example embodiments, the inlet valve 102 includes a butterfly plate 103. The butterfly plate 103 rotates between an open position and a closed position to respectively allow or block working fluid through the inlet valve 102.

A blowdown valve inlet 160 of the blowdown valve 106 is coupled to the discharge venturi 150 at the discharge of the second air-end 138. The blowdown valve 106 is configured to release the buildup pressure within the fluid compressor system 100 through a blowdown valve outlet 162 when the fluid compressor system 100 is in the unloading operation and the blowdown valve 106 is open. In example embodiments, the blowdown valve outlet 162 is coupled to a blowdown muffler 148 to reduce noise and/or a blowdown diffuser (not shown) to distribute the exhausting hot compressed working fluid.

Figure 3:
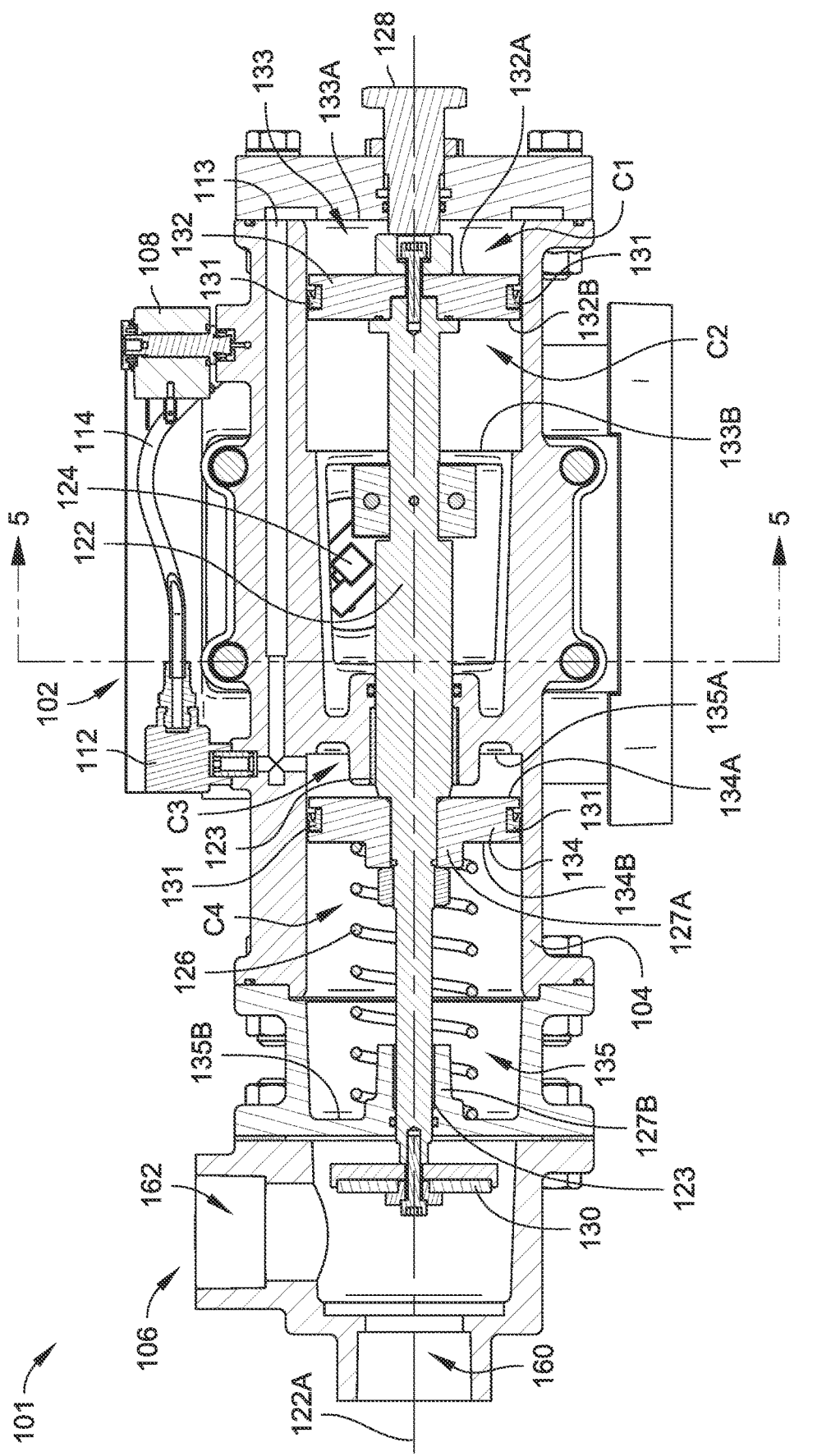
FIG. 3 is a cross-sectional view of the pneumatic inlet/blowdown valve assembly shown in FIG. 1, wherein a dual-piston is in an idle condition, in accordance with example embodiments of the present disclosure.
Figure 4:
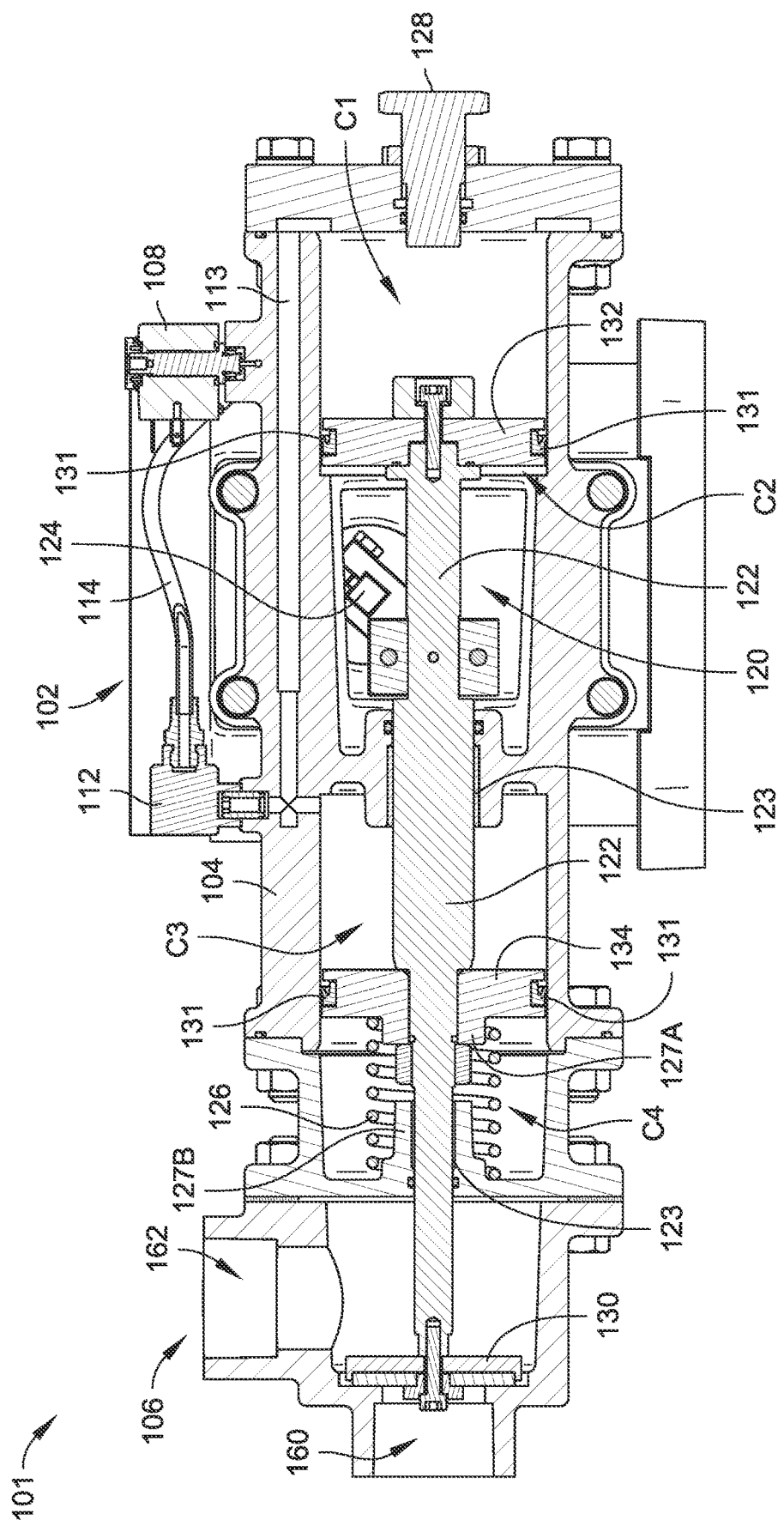
FIG. 4 is a cross-sectional view of the pneumatic inlet/blowdown valve assembly shown in FIG. 1, wherein a dual-piston is in an actuated condition, in accordance with example embodiments of the present disclosure.
Figure 5:
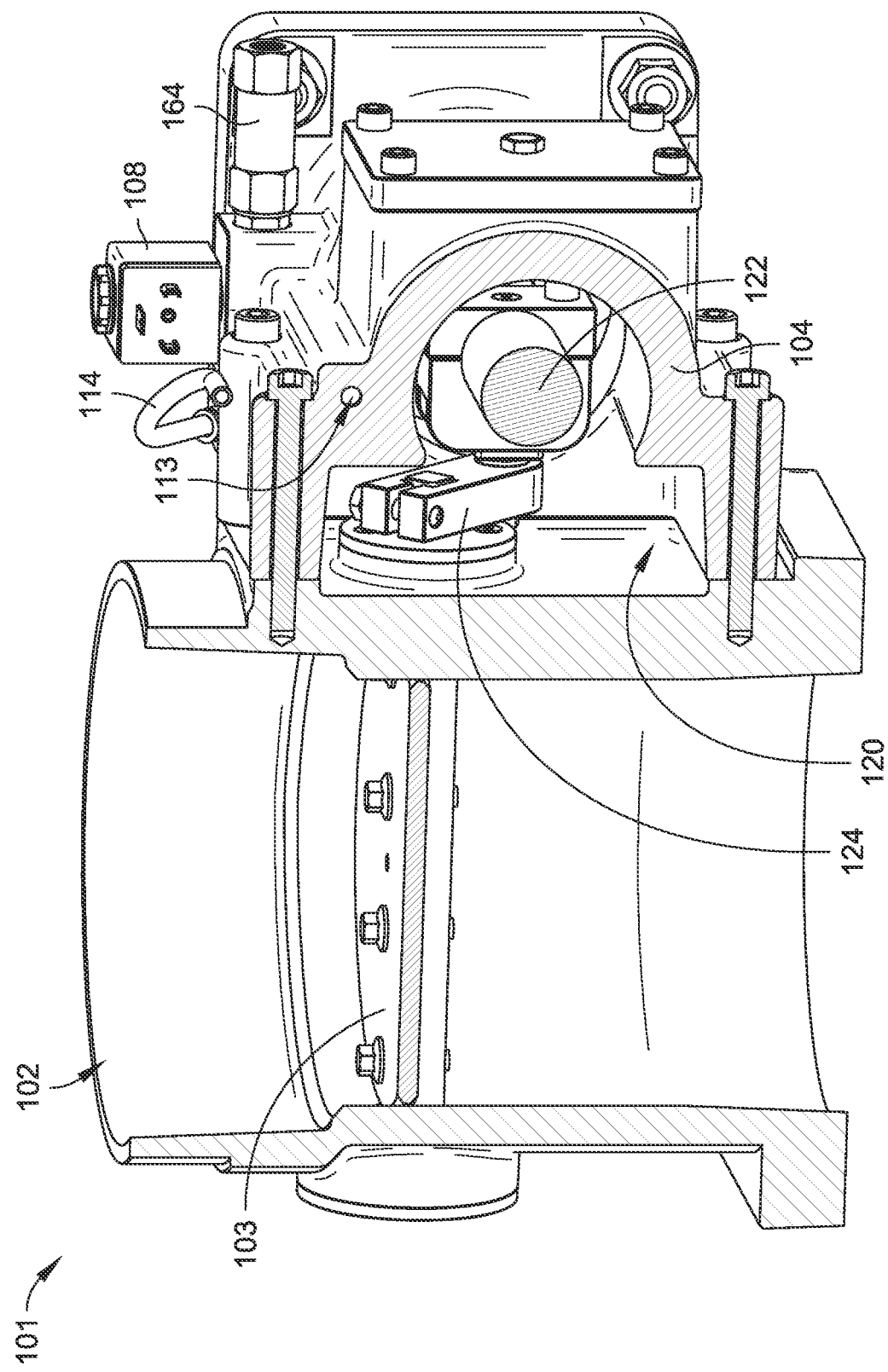
FIG. 5 is a side cross-sectional view of the pneumatic inlet/blowdown valve assembly along line '5' of FIG. 3, illustrating a crank shaft connecting a piston shaft with a butterfly plate of the inlet valve.
Figure 6:
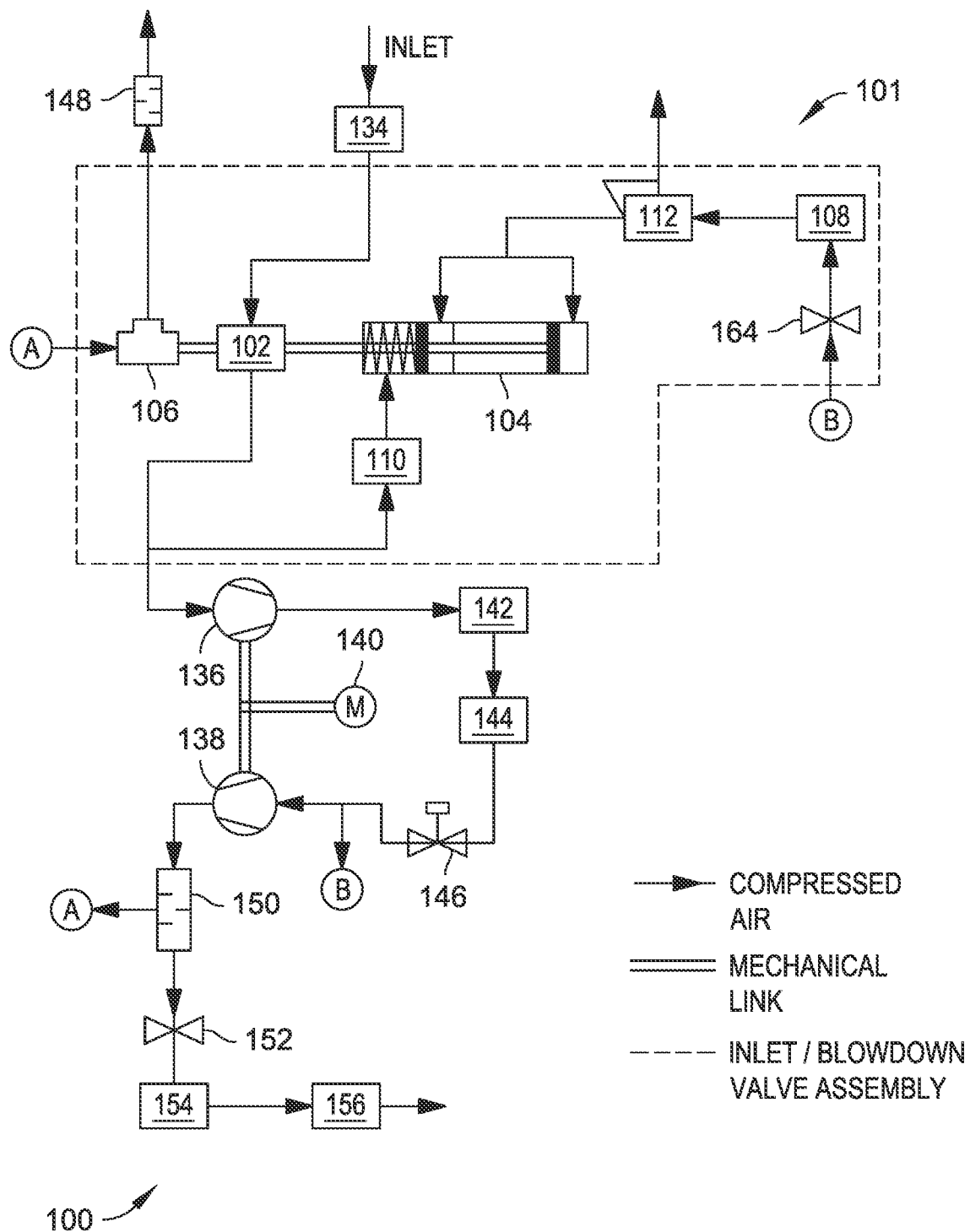
FIG. 6 is a schematic view of a compression system including a pneumatic inlet/blowdown valve assembly in accordance with example embodiments of the present disclosure.

The piston-cylinder actuator 104, as shown in FIGS. 3 and 4, is mechanically coupled to the inlet valve 102 and the blowdown valve 106. The piston-cylinder actuator 106 includes a first piston 132 housed within a first cylinder chamber 133, and a second piston 134 housed within a second cylinder chamber 135. The first cylinder chamber 133 has a first cylinder chamber end 133A and a second cylinder chamber end 133B. Likewise, the second cylinder chamber 135 has a first cylinder chamber end 135A and a second cylinder chamber end 135B. In example embodiments, the first piston 132 and the second piston 134 are axially connected by a piston shaft 122 having an axis 122A.

The piston shaft 122 slides within the piston-cylinder actuator 104 in a linear motion along the axis 122A, supported by guide bearings 123.

The first cylinder chamber 133 defines a first chamber C1 between a first side of the first piston 132A and the first cylinder chamber end 133A and a second chamber C2 between a second side of the first piston 132B and the second cylinder chamber end 133B. The second cylinder chamber 135 defines a third chamber C3 between a first side of the second piston 134A and the first cylinder chamber end 135A. The second cylinder chamber 135 defines a fourth chamber C4 between a second side of the second piston 134B and the second cylinder chamber end 135B.

The first piston 132 and the second piston 134 include at least one piston seal 131 disposed around an outer circumference of each respective piston. The at least one piston seal 131 prevents the escape of air from the first cylinder chamber 133, between the first chamber C1 and the second chamber C2, and the second cylinder chamber 135, between the third chamber C3 and the fourth chamber C4. In the example embodiment shown in FIGS. 3 and 4, the piston seals 131 are V-ring seals. In other example embodiments, the piston seals 131 may be U-rings, O-rings, flat seals, lip seals, guide rings, among others. The ring seals may be composed from Polytetrafluoroethylene (PTFE), nitrile, neoprene, ethylene propylene diene monomer (EPDM) rubber, a fluorocarbon rubber, or a combination thereof.

In example embodiments, a compression spring 126 is disposed within the fourth chamber C4, where the compression spring 126 is in contact with the second side 134B of the second piston 134 and second cylinder chamber end 135B of the second cylinder chamber 135. The compression spring 126 biases the second piston 134 in a first direction away from the second cylinder chamber end 135B of the second cylinder chamber 135, and towards the first cylinder chamber end 135A of the second cylinder chamber 135.

In embodiments, the piston-cylinder actuator 104 includes spring supports 127A and 127B. Spring support 127A is defined on the second side of the second piston 134B. Spring support 127B is defined on the second end 135B of the second cylinder chamber 135. Spring guides 127A and 127B guide spring 126, keeping it in a position concentric with the piston shaft 122, and attached to the second cylinder chamber 135 and the second piston 134.

The pneumatic inlet/blowdown valve assembly 101 includes a slider crank 124 disposed within a slider crank chamber 120. The piston-cylinder actuator 104 defines the slider crank chamber 120 between the first cylinder chamber 133 and the second cylinder chamber 135. The slider crank 124 is coupled on one end to the butterfly plate 103 of the inlet valve 102 and on a second end to the piston shaft 122. The slider crank 124 opens and closes the butterfly plate 103 of the inlet valve 102 depending on the position of the piston shaft 122. As the piston shaft 122 moves from the idle state to the actuated state, the butterfly plate 103 is rotated within the inlet valve 102, between a closed position, to an open position, respectively. The pneumatic inlet/blowdown valve assembly 101 also includes a blowdown valve piston cap 130 disposed within the blowdown valve 106 and coupled to the piston shaft 122. The blowdown valve piston cap 130 is configured to open and close the blowdown valve 106 through the blowdown valve inlet 160. As the piston shaft 122 moves from the idle state to the actuated state, the blowdown piston cap 130 is actuated within the blowdown valve 10, between an open position, to a closed position, respectively.

During operation of the inlet/blowdown valve assembly 101, the first piston 132 and the second piston 134 are configured to be actuated between an idle state and an actuated state. In the idle state, shown in FIG. 3, the inlet valve 102 is closed to stop the flow of the working fluid into the first air-end 136 and the blowdown valve inlet 160 of the blowdown valve 106 is open to depressurize the fluid compressor system 100 through the blowdown valve outlet 162. In the actuated state, shown in FIG. 4, the inlet valve 102 is open to allow the flow of the working fluid into the first air-end 136 and the blowdown valve inlet 160 is closed to allow a pressure buildup in the fluid compressor system 100.

In example embodiments, the fluid compressor system 100 is operated between an unload state and a load state by controlling electrical signals to energize and actuate the first solenoid valve 110 and the second solenoid valve 108 (not shown). The fluid compressor system 100 may remain in the unload state (or idle state) when the first solenoid valve 110 and the second solenoid valve 108 are in a de-energized state. In embodiments, both the first solenoid valve 110 and the second solenoid valve 108 are energized together to change the state of the fluid compressor system 100 to the load state. In other embodiments, the first solenoid valve 110 and the second solenoid valve 108 are energized asynchronously.

Figure 2:
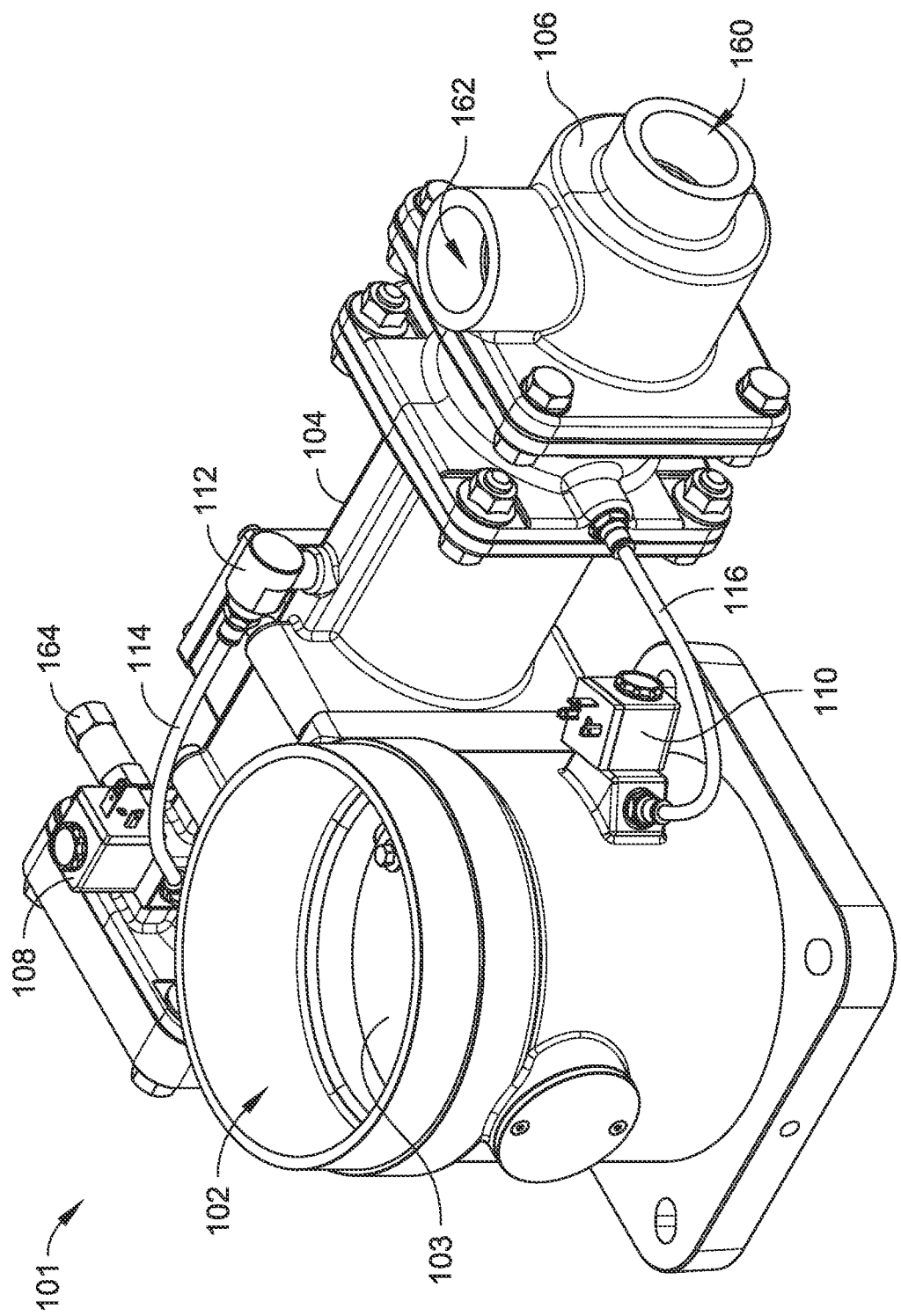
FIG. 2 is an isometric back view of the pneumatic inlet/blowdown valve assembly shown in FIG. 1 in accordance with example embodiments of the present disclosure.

The first solenoid valve 110 of the pneumatic inlet/blowdown valve assembly 101 is connected between the butterfly plate 103 and the first air-end 136 and is connected to the fourth chamber C4 via a first connecting tube 116 as shown in FIG. 2. At the start of the loading operation, the pneumatic inlet/blowdown valve assembly 101 is in the idle state, with the butterfly plate 103 of the inlet valve 102 closed. As the motor 140 is energized and reaches a maximum speed, a first stage vacuum pressure is built below the butterfly plate 103 and upstream of the first air-end 136. The first solenoid valve 110 is energized, allowing the first stage vacuum pressure to flow into the fourth chamber C4 of the piston-cylinder actuator 104.

As the first stage vacuum is supplied to the fourth chamber C4, the compression spring 126 is compressed, pulling the second piston 134 towards the second cylinder chamber end 135B of the second cylinder chamber 135. Thus, the piston shaft 122 moves the blowdown valve piston cap 130, the first piston 132, the second piston 134, and the slider crank 124 into the actuated position. The blowdown valve piston cap 130 closes the blowdown valve inlet 160, allowing the pressure within the fluid compressor system 100 to increase. The slider crank 124 simultaneously rotates the butterfly plate 103, opening the inlet valve 102 to allow the working fluid to flow into the first air-end 136, thereby compressing the working fluid and supplying an interstage pressure.

As the butterfly plate 103 completely opens, the first stage vacuum is supplied at a reduced amount into the fourth chamber C4. The actuated state of the piston-cylinder actuator 104 is maintained through the interstage pressure that the first air-end 136 supplies. In example embodiments, an interstage pressure tap 'B' is provided between the interstage moisture separator 144 and the second air-end 138. In other embodiments, the pressure tap 'B' is provided between the first air-end 136 and the second air-end 138. The interstage pressure is supplied to the first chamber C1 and the third chamber C3 via an inline check valve 164 mounted to an inlet port of the second solenoid valve 108 and further through the quick exhaust valve 112, passing through channel 113. The pressure buildup in the first chamber C1 and the third chamber C3 aid the first piston 132 and the second piston 134 to maintain the actuated position of the second cylinder chamber end 133B of the first cylinder chamber 133 and the second cylinder chamber end 135B of the second cylinder chamber 135, respectively. The second piston 134 holds the compression spring 126 in a compressed position while the fluid compressor system 100 is loading, as shown in the example embodiment of FIG. 4.

In example embodiments, an inline check valve 164 is coupled between the interstage pressure tap 'B' and the second solenoid valve 108 to restrict interstage vacuum action on the first chamber C1 and the third chamber C3 during startup of the fluid compressor system 100 or when the fluid compressor system 100 changes from the unloading operation to the loading operation.

In example embodiments, the pneumatic inlet/blowdown valve assembly 101 further includes a quick exhaust valve 112 connected between the second solenoid valve 108 and the first chamber C1 and third chamber C3 via a second connecting tube 114. When the fluid compressor system 100 is set to the unloading operation, the second solenoid valve 108 is de-energized and the quick exhaust valve 112 rapidly vents the pressure buildup in the first chamber C1 and the third chamber C3, allowing the compression spring 126 to push second piston 134 along with the piston shaft 122 back to the idle state shown in FIG. 3, where the inlet valve 102 is closed and the blowdown valve 106 is open to vent the pressure buildup of the fluid compressor system 100 through a second stage blowdown piping 'A'.

In example embodiments, the piston-cylinder actuator includes a vacuum setting screw 128 to manually adjust an unload vacuum for different package combinations of the fluid compressor system 100. The linear adjustments set through the vacuum setting screw 128 pushes the piston shaft 122 forward in steps, moving the slider crank 124 which is coupled on the one end to the butterfly plate 103. The setting of the vacuum setting screw may adjust the angular position of the butterfly plate 103 in steps to maintain optimum clearance between the butterfly plate 103 and a housing of the inlet valve 102 housing.

In example embodiments, the interstage pressure supplied to the first chamber C1 and the third chamber C3 via the second solenoid valve 108 to keep the blowdown valve 106 closed and the compression spring 126 compressed. In such embodiments, a larger piston-cylinder area may be used to balance the frictional forces on the first piston 132 and the second piston 134 to remain in the actuated state. Depending on the interstage pressure available, additional pistons (not shown) employing similar cylinder chamber arrangements may be disposed in the piston-cylinder actuator 104. In example embodiments, the size of the compression spring 126 is selected based on the size of the second cylinder chamber 135, so as the second piston 134 retracts sufficiently (e.g., completely) during the unload operation.

In other example embodiments (not shown), the pneumatic inlet/blowdown valve assembly 101 includes a vacuum-assisted spring return mechanism. In such embodiments, the second solenoid valve 108 includes a relief line that is connected back to the first stage vacuum pressure for quickly returning the pneumatic inlet/blowdown valve assembly to its idle state, wherein the compression spring 126 biases the blowdown valve piston cap 130 to open the blowdown valve 106.

In example embodiments, the fluid compressor system 100 is an oil-free rotary (OFR) screw compressor. In other example embodiments (not shown), the fluid compressor system may be a contact-cooled rotary CCR screw compressor, a rotary vane compressor, a reciprocating compressor, a centrifugal compressor or an axial compressor. In other example embodiments, the pneumatic inlet-blowdown valve assembly 101 may be incorporated or retrofitted with other equipment having a compression application, including but not limited to, heating, ventilation, and air conditioning (HVAC) systems, refrigeration systems, gas turbine systems, and so forth.

While the subject matter has been illustrated and described in detail in the drawings and foregoing description, the same is to be considered as illustrative and not restrictive in character, it being understood that only the preferred embodiments have been shown and described and that all changes and modifications that come within the spirit of the subject matters are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the subject matter, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A fluid compressor system for compressing a working fluid comprising:
    a first air-end operable to receive and compress the working fluid;
    a second air-end operable to receive the working fluid from the first air-end and further compress the working fluid; and
    a pneumatic inlet/blowdown valve assembly including:
    an inlet valve for receiving the working fluid into the fluid compressor system, the inlet valve configured to regulate a flow of the working fluid into the first air-end,
    a blowdown valve coupled to a discharge of the second air-end, the blowdown valve configured to release a pressure within the fluid compressor system, and
    a piston-cylinder actuator in communication with the inlet valve and the blowdown valve, the piston-cylinder actuator including:
    a first piston housed within a first cylinder,
    a second piston housed within a second cylinder, the first piston and the second piston axially connected by a piston shaft, the first cylinder defining a first chamber at a first side of the first piston and a second chamber at a second side of the first piston and the second cylinder defining a third chamber at a first side of the second piston and a fourth chamber at a second side of the second piston,
    a compression spring disposed within the fourth chamber, and
    a blowdown valve piston cap disposed within the blowdown valve, the blowdown valve piston cap coupled to the piston shaft and configured to open and close the blowdown valve,
    the first piston and the second piston configured to be actuated between an idle state wherein the inlet valve is closed to stop the flow of the working fluid into the fluid compressor system and the blowdown valve is open to depressurize the fluid compressor system, and an actuated state wherein the inlet valve is open to allow the flow of the working fluid into the first air-end and the blowdown valve is closed to allow a pressure buildup in the fluid compressor system.

2. The fluid compressor system of claim 1, wherein the pneumatic inlet/blowdown valve assembly further includes a first solenoid valve connected between the inlet valve and the first air-end, the first solenoid valve in communication with the fourth chamber.

3. The fluid compressor system of claim 2, wherein the first solenoid valve supplies a first stage vacuum pressure to the fourth chamber of the piston-cylinder actuator, the first stage vacuum pressure compressing the compression spring and actuating the first piston and the second piston from the idle state to the actuated state.

4. The fluid compressor system of claim 3, wherein the pneumatic inlet/blowdown valve assembly further includes a second solenoid valve connected to an interstage pressure tap between the first air-end and the second air-end, the second solenoid valve in communication with the first chamber and the third chamber.

5. The fluid compressor system of claim 4, wherein the second solenoid valve supplies an interstage pressure to the first chamber and the third chamber of the piston-cylinder actuator when energized, the interstage pressure maintaining the first piston and the second piston at the actuated state while the fluid compressor system is loading.

6. The fluid compressor system of claim 5, wherein the pneumatic inlet/blowdown valve assembly further includes a quick exhaust valve connected between the second solenoid valve and the first chamber and third chamber, wherein when the fluid compressor system is unloading, the second solenoid valve is de-energized, the quick exhaust valve is configured to vent the pressure buildup in the first chamber and the third chamber, and the compression spring pushes the first piston and the second piston back to the idle state.

7. The fluid compressor system of claim 1, wherein the piston shaft is mechanically coupled to a slider crank mechanism that moves the inlet valve between an open position and a closed position.

8. The fluid compressor system of claim 1, wherein the fluid compressor system is an oil-free rotary (OFR) compressor.

9. A pneumatic inlet/blowdown valve assembly for a fluid compressor system comprising:
    an inlet valve wherein a working fluid enters the fluid compressor system, the inlet valve regulating a flow of the working fluid into a first air-end, the first air-end operable to receive and compress the working fluid,
    a blowdown valve coupled to a discharge of the second air-end, the blowdown valve configured to release a pressure within the fluid compressor system, and
    a piston-cylinder actuator in communication with the inlet valve and the blowdown valve, the piston-cylinder actuator including:
    a first piston housed within a first cylinder,
    a second piston housed within a second cylinder, the first piston and the second piston axially connected by a piston shaft, the first cylinder defining a first chamber at a first side of the first piston and a second chamber at a second side of the first piston and the second cylinder defining a third chamber at a first side of the second piston and a fourth chamber at a second side of the second piston, a compression spring disposed within the fourth chamber, and the first piston and the second piston configured to be actuated between an idle state wherein the inlet valve is closed to stop the flow of the working fluid into the fluid compressor system and the blowdown valve is open to depressurize the fluid compressor system, and an actuated state wherein the inlet valve is open to allow the flow of the working fluid into the first air-end and the blowdown valve is closed to allow a pressure buildup in the fluid compressor system.

10. The pneumatic inlet/blowdown valve assembly of claim 9, further including a first solenoid valve connected between the inlet valve and the first air-end, the first solenoid valve in communication with the fourth chamber.

11. The pneumatic inlet/blowdown valve assembly of claim 10, wherein the first solenoid valve supplies a first stage vacuum pressure to the fourth chamber of the piston-cylinder actuator, the first stage vacuum pressure compressing the spring and actuating the first piston and the second piston from the idle state to the actuated state.

12. The pneumatic inlet/blowdown valve assembly of claim 11, further including a second solenoid valve connected to an interstage pressure tap between the first air-end and the second air-end, the second solenoid valve in communication with the first chamber and the third chamber.

13. The pneumatic inlet/blowdown valve assembly of claim 12, wherein the second solenoid valve supplies an interstage pressure to the first chamber and the third chamber of the piston-cylinder actuator when energized, the interstage pressure maintaining the first piston and the second piston at the actuated state while the fluid compressor system is loading.

14. The pneumatic inlet/blowdown valve assembly of claim 13, further including a quick exhaust valve connected between the second solenoid valve and the first chamber and third chamber, wherein when the second solenoid valve is de-energized, the quick exhaust valve is configured to vent the pressure buildup in the first chamber and the third chamber, and the compression spring pushes the first piston and the second piston to the idle state.

15. The pneumatic inlet/blowdown valve assembly of claim 9, wherein the piston shaft is mechanically coupled to a slider crank mechanism that moves the inlet valve between an open position and a closed position.

16. The pneumatic inlet/blowdown valve assembly of claim 9, wherein the fluid compressor system is an oil-free rotary (OFR) compressor.

17. A fluid compressor system for compressing a working fluid comprising:

a first air-end operable to receive and compress the working fluid;

a second air-end operable to receive the working fluid from the first air-end and further compress the working fluid; and a pneumatic inlet/blowdown valve assembly including:

an inlet valve for receiving the working fluid into the fluid compressor system, the inlet valve configured to regulate a flow of the working fluid into the first air-end, a blowdown valve coupled to a discharge of the second air-end, the blowdown valve configured to release a pressure within the fluid compressor system, and a piston-cylinder actuator in communication with the inlet valve and the blowdown valve, the piston-cylinder actuator including:

a first piston housed within a first cylinder, a second piston housed within a second cylinder, the first piston and the second piston axially connected by a piston shaft, the first cylinder defining a first chamber at a first side of the first piston and a second chamber at a second side of the first piston and the second cylinder defining a third chamber at a first side of the second piston and a fourth chamber at a second side of the second piston, and a compression spring disposed within the fourth chamber, the first piston and the second piston configured to be actuated between an idle state wherein the inlet valve is closed to stop the flow of the working fluid into the fluid compressor system and the blowdown valve is open to depressurize the fluid compressor system, and an actuated state wherein the inlet valve is open to allow the flow of the working fluid into the first air-end and the blowdown valve is closed to allow a pressure buildup in the fluid compressor system.

18. The fluid compressor system of claim 17, wherein the pneumatic inlet/blowdown valve assembly further includes a first solenoid valve connected between the inlet valve and the first air-end, the first solenoid valve in communication with the fourth chamber.

19. The fluid compressor system of claim 18, wherein the first solenoid valve supplies a first stage vacuum pressure to the fourth chamber of the piston-cylinder actuator, the first stage vacuum pressure compressing the compression spring and actuating the first piston and the second piston from the idle state to the actuated state.

20. The fluid compressor system of claim 19, wherein the pneumatic inlet/blowdown valve assembly further includes a second solenoid valve connected to an interstage pressure tap between the first air-end and the second air-end, the second solenoid valve in communication with the first chamber and the third chamber and wherein the second solenoid valve supplies an interstage pressure to the first chamber and the third chamber of the piston-cylinder actuator when energized, the interstage pressure maintaining the first piston and the second piston at the actuated state while the fluid compressor system is loading.

* * * * *